United States Patent
Heo et al.

(10) Patent No.: US 9,961,368 B2
(45) Date of Patent: May 1, 2018

(54) METHOD AND DEVICE FOR DETERMINING A UNIT OF A TRANSFORM UNIT USED IN VIDEO SIGNAL PROCESSING

(71) Applicant: LG Electronics Inc., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 14/396,595

(22) PCT Filed: Apr. 24, 2013

(86) PCT No.: PCT/KR2013/003497
§ 371 (c)(1),
(2) Date: Oct. 23, 2014

(87) PCT Pub. No.: WO2013/162272
PCT Pub. Date: Oct. 31, 2013

(65) Prior Publication Data
US 2015/0117517 A1   Apr. 30, 2015

Related U.S. Application Data

(60) Provisional application No. 61/637,275, filed on Apr. 24, 2012.

(51) Int. Cl.
*H04N 7/26* (2006.01)
*H04N 19/44* (2014.01)
*H04N 19/169* (2014.01)
*H04N 19/61* (2014.01)
(Continued)

(52) U.S. Cl.
CPC ......... *H04N 19/597* (2014.11); *H04N 19/105* (2014.11); *H04N 19/119* (2014.11);
(Continued)

(58) Field of Classification Search
USPC .......................................... 375/240
See application file for complete search history.

(56) References Cited

U.S. PATENT DOCUMENTS 8,948,271 B2 * 2/2015 Zhou ..................... H04N 19/61
348/43
9,380,319 B2 * 6/2016 Panusopone ......... H04N 19/159
(Continued)

FOREIGN PATENT DOCUMENTS

KR   1020110044487   4/2011
KR   1020110090781   8/2011
(Continued)

*Primary Examiner* — Jeremaiah C Hallenbeck-Huber
*Assistant Examiner* — Susan E Hodges
(74) *Attorney, Agent, or Firm* — Dentons US LLP

(57) ABSTRACT

The present invention variably adjusts the maximum splitting information of a conversion unit according to the type of prediction unit and the splitting information on a coding unit and selects the optimal splitting information on the conversion unit. The present invention determines the maximum splitting information on the conversion unit of a depth block by using the maximum splitting information on the conversion unit for texture data. The present invention may lower complexity without a loss in efficiency by variably adjusting the maximum splitting information on the conversion unit in consideration of the characteristics of the depth data. The present invention may lower complexity by determining the maximum splitting information on the conversion unit of the depth data by using similar characteristics between the texture data and the depth data.

2 Claims, 8 Drawing Sheets

(51) Int. Cl.
*H04N 19/597* (2014.01)
*H04N 19/119* (2014.01)
*H04N 19/105* (2014.01)
*H04N 19/122* (2014.01)
*H04N 19/146* (2014.01)
*H04N 19/147* (2014.01)
*H04N 19/18* (2014.01)
*H04N 19/176* (2014.01)
*H04N 19/96* (2014.01)
*H04N 19/136* (2014.01)

(52) U.S. Cl.
CPC ......... *H04N 19/122* (2014.11); *H04N 19/146* (2014.11); *H04N 19/147* (2014.11); *H04N 19/18* (2014.11); *H04N 19/136* (2014.11); *H04N 19/176* (2014.11); *H04N 19/61* (2014.11); *H04N 19/96* (2014.11)

(56) References Cited

U.S. PATENT DOCUMENTS

| | | | | |
|---|---|---|---|---|
| 2011/0038422 | A1* | 2/2011 | Cheon | H04N 19/147 375/240.18 |
| 2011/0243232 | A1* | 10/2011 | Alshina | H04N 19/61 375/240.16 |
| 2012/0230421 | A1* | 9/2012 | Chen | H04N 19/176 375/240.18 |
| 2012/0269274 | A1* | 10/2012 | Kim | H04N 19/176 375/240.24 |

FOREIGN PATENT DOCUMENTS

| | | |
|---|---|---|
| KR | 1020110119709 | 11/2011 |
| KR | 1020110133532 | 12/2011 |
| KR | 1020110134319 | 12/2011 |

\* cited by examiner

A partitioning of the transform unit when maximum partitioning information
of the transform unit is set to 3

METHOD AND DEVICE FOR DETERMINING A UNIT OF A TRANSFORM UNIT USED IN VIDEO SIGNAL PROCESSING

This application is a 35 USC § 371 National Stage entry of International Application No. PCT/KR2013/003497 filed on Apr. 24, 2013, and claims priority of U.S. Provisional Application No. 61/637,275 filed on Apr. 24, 2012, each of which is hereby incorporated by reference in its entirety.

FIELD OF THE INVENTION

The present invention relates to a method and apparatus for coding video signals.

BACKGROUND ART

Compression encoding refers to a series of signal processing techniques for transmitting digitalized information through a communication circuit or for storing digitalized signals in a storage medium in an adequate format. Compression encoding subjects may correspond to sound (or audio data), images (or video data), text, and so on, and, most particularly, a technique of performing compression encoding on images (or video data) is referred to as video image compression. The general characteristics of a multi-view video image is that it includes spatial redundancy, temporal redundancy, and view redundancy.

DETAILED DESCRIPTION OF THE INVENTION

Technical Objects

An object of the present invention is to enhance coding efficiency of video signals.

Technical Solutions

The present invention variably adjusts the maximum splitting information of a conversion unit according to the type of prediction unit and the splitting information on a coding unit and selects the optimal splitting information on the conversion unit.

The present invention determines the maximum splitting information on the conversion unit of a depth block by using the maximum splitting information on the conversion unit for texture data.

Effects of the Invention

The present invention may lower complexity without a loss in efficiency by variably adjusting the maximum splitting information on the conversion unit in consideration of the characteristics of the depth data.

The present invention may lower complexity by determining the maximum splitting information on the conversion unit of the depth data by using similar characteristics between the texture data and the depth data.

BEST MODE FOR CARRYING OUT THE PRESENT INVENTION

Figure 1:
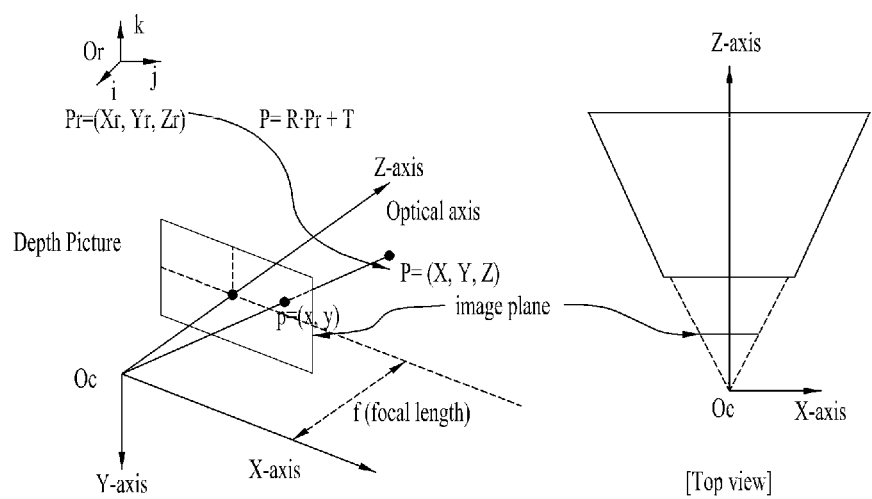
FIG. 1 illustrates a concept of depth as an exemplary embodiment having the present application applied thereto.

The present invention acquires prediction unit information and coding unit information of depth data, acquires maximum partitioning information of a transform unit of a depth block by using the prediction unit information and the coding unit information, decides transform unit size information of the depth block by using the maximum partitioning information of the transform unit of the depth block, and performs inverse-transform on depth data by using the transform unit size information of the depth block, and the step of deciding transform unit size information of the depth block includes deciding a size of the transform unit within a maximum partitioning information range of the transform unit.

MODE FOR CARRYING OUT THE PRESENT INVENTION

A technique of performing compression encoding or decoding on multiview video signal data is realized based upon spatial redundancy, temporal redundancy, and redundancy existing between views. Additionally, in case of a multiview image, in order to realize a three-dimensional (3D) image, a multiview texture image taken (or captured) from 2 or more views and a multiview depth image corresponding to the multiview texture image should be coded. In coding the depth image, it will be evident that compression coding may be performed based upon spatial redundancy, temporal redundancy, or inter-view redundancy. Each sample value of the depth image expresses a distance between the camera and the respective pixel. Additionally, in this specification, terms such as depth information, depth data, depth picture, depth sequence, depth coding, depth bitstream, and so on, may be flexibly interpreted as information related to depth. Depending upon the circumstances, coding may be interpreted as encoding or decoding, and information corresponds to a term including all of values, parameter, coefficients, elements, and so on, and may be interpreted as an adequate meaning depending upon the circumstances. A 'screen' or 'picture' generally refers to a unit displaying an image corresponding to a specific time period, and a 'slice', 'frame', and so on, corresponds to a unit configuring a portion of a picture when actually coding a video signal, however, whenever required, the terms may be used in combination. A 'pixel', 'picture element', or 'pel' signifies a minimum unit configuring an image. As a term indicating a value of a specific pixel, the term 'sample' may be used. Although a sample may be divided into Luma and Chroma components, the term sample is generally used as a term including both components. The Chroma component mentioned above indicates a difference between decided colors and is generally configured of Cb and Cr. A 'unit' has been used to indicate a basic unit of image processing or a specific position of an image, and, in some cases, the term 'unit' may be used in combination with other terms, such as 'block' or 'area'. However, in general cases, a block is used as a term indicating a group of samples each consisting of M number of columns and N number of rows or a group of transform coefficients.

FIG. 1 illustrates a concept of depth as an exemplary embodiment having the present invention applied thereto.

Referring to FIG. 1, a camera position (Oc) indicates a starting point of a 3D camera coordinate system, and a Z-axis (optical axis) forms a straight line with a viewing direction of the eye. An arbitrary one point P=(X,Y,Z) of the camera coordinate system may be reflected as an arbitrary one point p=(x,y) within a two-dimensional (2D) image plane, which is perpendicular to the Z-axis. Herein, the arbitrary one point p=(x,y) within the 2D image plane may be expressed as a texture value or color value of the arbitrary one point P=(X,Y,Z) of the 3D coordinate system, and, in this case, the 2D image plane may signify a texture picture. Meanwhile, p=(x,y) within the 2D image plane may be expressed as a Z value of P=(X,Y,Z) of the 3D coordinate system, and, in this case, the 2D image plane may signify a depth picture or a depth map.

Additionally, although P=(X,Y,Z) of the 3D coordinate system indicates an arbitrary one point of the camera coordinate system, when image-capturing is performed by using multiple cameras, a reference coordinate system commonly shared by all of the multiple cameras may be required. In FIG. 1, an arbitrary one point of a reference coordinate system based upon point Ow may be determined as Pw=(Xw, Yw, Zw), and Pw=(Xw, Yw, Zw) may be converted (or translated) to the arbitrary one point P=(X,Y,Z) of the camera coordinate system by using a 3×3 rotation matrix R and a 3×1 translation vector T. For example, the point P may be acquired by using Equation 1.

$$P = R \times P_W + T \quad \text{Equation 1}$$

Based upon the description provided above, the depth picture may be defined once again as a collection of diverse information corresponding to a distance between a camera position and an actual object, wherein the distance is digitized to a relative value based upon a position of the camera. Depth information within the depth picture may be acquired from a Z value of a 3D coordinate P=(X, Y, Z) within a camera coordinate system, which corresponds to an arbitrary pixel of a texture picture. Herein, the Z value may correspond to a value belonging to a range of real numbers, and this may be quantized to a value belonging to a range of integers, thereby being used as depth information. For example, the depth information may be quantized as shown in Equation 2 or Equation 3 shown below.

$$Z_q = \text{round}\left(255 \times \frac{Z - Z_{near}}{Z_{far} - Z_{near}}\right) \quad \text{Equation 2}$$

$$Z_q = \text{round}\left(255 \times \frac{\frac{1}{Z} - \frac{1}{Z_{near}}}{\frac{1}{Z_{near}} - \frac{1}{Z_{far}}}\right) \quad \text{Equation 3}$$

Herein, $Z_q$ represents quantized depth information, and, referring to a [Top view] of FIG. 1, $Z_{near}$ may signify the lower limit of a Z coordinate value, and $Z_{far}$ may signify the upper limit of a Z coordinate value. And, the quantized depth information, which is quantized in accordance with Equation 2 or Equation 3 shown above, may have an integer value within a range of 0-255.

The depth picture may be coded along with a texture image sequence or may be coded as a separate sequence, and, in this case, diverse exemplary embodiments may be applied for backward compatibility with the conventional codec. For example, a depth coding technique may be applied as a supplemental technique in order to establish backward compatibility with an HEVC codec, and, alternatively, the depth coding technique may also be applied as an extension technique in H.264/AVC multiview video coding. Hereinafter, exemplary embodiments of a method and apparatus for predicting texture data by using depth data will be described in detail.

An encoding device according to an exemplary embodiment of the present invention is configured to include a transformer, a quantization unit, an inverse quantization unit, an inverse transformer, a filtering unit, a prediction unit, and/or an entropy coding unit, and so on.

The transformer transforms a pixel value respective to a received video signal and acquires a transform coefficient value. As the above-described transform method, for example, DCT (Discrete Cosine Transform) or Wavelet Transform, and so on, may be used. The transformer performs transform by inputting the inputted image signal to units of a consistent size.

The quantization unit quantizes the transform coefficient value that is outputted from the transformer.

The filtering unit performs filtering calculation (or operation) for quality enhancement of the image. As a filter being used in the filtering unit, for example, a deblocking filter and/or an adaptive loop filter, and so on, may be included. A frame storage unit may output the recovered image or may store the recovered image in order to use the stored image as a reference image.

Instead of coding an image signal without modification in order to increase the coding efficiency, a method of predicting an image by using an already-coded area and acquiring a recovered image by adding a residual value between the original image and the prediction image to the predicted image is used. As a method for predicting images, intra prediction, inter prediction, and so on, may be used, and, accordingly, the prediction unit may include an intra prediction unit and an inter prediction unit.

The intra prediction unit performs intra prediction from recovered areas within the current image and delivers intra coding information to the entropy coding unit. The inter prediction unit predicts the current image by using at least one or more reference images, which are stored in the frame storage unit, and performs inter (or inter-screen) motion compensation.

The entropy coding unit generates a video signal bitstream by performing entropy coding on quantized transform coefficients, inter coding information, intra coding information, and reference area information inputted from the inter prediction unit, and so on. In the entropy coding unit, a VLC (Variable Coding Length) method and arithmetic coding, and so on, may be used.

Meanwhile, in correspondence to the operations of the encoder, the operations of the video signal decoding device may perform inverse processes of the encoder.

Figure 2:
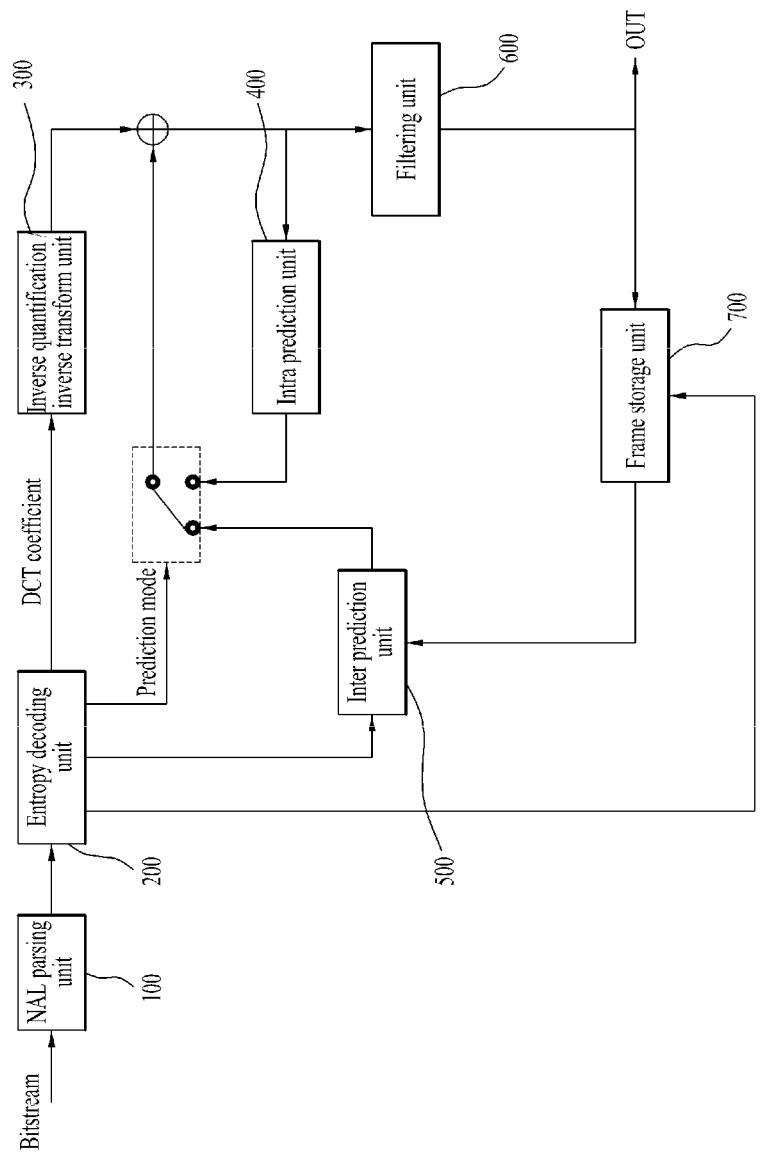
FIG. 2 illustrates a general block view of a video decoder as an exemplary embodiment having the present application applied thereto.

FIG. 2 illustrates a general block view of a video decoder as an exemplary embodiment having the present invention applied thereto.

The decoding device according to the exemplary embodiment of the present invention is configured to include a parsing unit (100), an entropy decoding unit (200), an inverse quantization unit/inverse transformer (300), a filtering unit (600), an intra prediction unit (400), an inter prediction unit (500), a frame storage unit (700), and so on.

In order to decode the inputted bitstream, the parsing unit (100) may perform parsing in NAL units. In case the inputted bitstream corresponds to data related to multiview, the inputted bitstream may include a camera parameter. The camera parameter may include an intrinsic camera parameter and an extrinsic camera parameter, and the intrinsic camera parameter may include a focal length, an aspect ratio, a principal point, and so on, and the extrinsic camera parameter may include position information of a camera in a global coordinate system, and so on.

As an inverse process of entropy encoding, the entropy decoding unit (200) may extract a coding type, a quantized conversion coefficient, coding information for predicting a texture picture and a depth picture, and so on, by performing entropy decoding on a video signal bitstream.

The inverse quantification/inverse transform unit (300) acquires a transform coefficient by applying a quantization parameter to the quantized transform coefficient, and, by performing inverse transform on the acquired transform coefficient, the inverse quantification/inverse transform unit (300) may decode texture data or depth data.

Similarly, the prediction unit includes an intra prediction unit (400) and an inter prediction unit (500), and the prediction unit recovers a prediction image by using information, such as the decoded encoding type, transform coefficients respective to each area, motion vector, and so on. The intra prediction unit (400) generates an intra prediction image from the decoded sample within the current image. Additionally, the inter prediction unit (500) generates an inter prediction image by using the reference image, which is stored in the frame storage unit. A recovered video frame is generated by adding a residual value respective to each pixel being recovered by the inverse transformer to a prediction image, which is outputted from the intra prediction unit (400) or the inter prediction unit (500).

Meanwhile, the filtering unit (600) enhances picture quality by performing filtering on the recovered video frame. Herein, a deblocking filter for reducing block distortion, an adaptive loop filter for removing distortion of the entire image, and so on, may be included. The image that has undergone the filtering process is outputted as a final image and is then stored in the frame storage unit (700) in order to be used as a reference image respective to a next frame.

A unit, a coding unit, coding unit partitioning information, a prediction unit, a transform unit, transform unit partitioning information, and maximum partitioning information of a transform unit, which are described in the present invention, will hereinafter be defined.

When applied to a video signal, the term unit, which is used in the present invention, may include all meanings including block, sub-block, macro block, slice, picture, frame, picture group, sequence, and so on. Therefore, the meaning of the unit shall be interpreted as a meaning corresponding to each of the respective application examples. Moreover, in addition to video signals, when applied to other signals, and so on, the term unit may also be interpreted as a different meaning best-fitting the respective signal.

A Coding Unit (CU) refers to a basic unit for processing images in the above-described video signal processing procedures. Coding unit (CU) partitioning information refers to information indicating a degree of partitioning of the coding unit within the Quard Tree structure. The size of a coding unit that is used when coding one image may not be consistent. The coding unit may have a rectangular form (or shape), and one coding unit may be further divided into multiple coding units. For example, one coding unit having the size of 2N×2N may become four coding units each having the size of N×N. Such division of coding units may be realized recursively, and not all coding units are required to be divided in the same form (or shape). Nevertheless, for simplicity in the coding and processing procedures, there may be limitations in the maximum size or the minimum size of the coding unit.

Information indicating whether or not a coding unit is being divided may be designated with respect to the corresponding coding unit. For example, when a flag value indicating whether or not the coding unit is being divided is equal to 1, a block respective to the corresponding node may be further divided into 4 blocks, and, when the flag value is equal to 0, the corresponding block is not divided any further and the processing procedure for the corresponding coding unit may be performed.

A structure of the above-described coding unit may be indicated by using a recursive tree structure. More specifically, one image or one maximum size coding unit may be given as a root, and a coding unit that is further divided into other coding units has a number of child nodes corresponding to the number of divided coding units. Accordingly, a coding unit that is no longer divided becomes a leaf node. When it is assumed that only a square division can be performed on a coding unit, since a coding unit can be further divided into a maximum of 4 coding units, a tree indicating the coding unit structure becomes a Quard tree format.

The encoder selects an optimal coding unit size in accordance with the characteristics (i.e., resolution) of the video image or based upon coding efficiency, and information on the optimal coding size or information that can induce the optimal coding size may be included in the bitstream. For example, a maximum coding unit size and a maximum depth of the tree may be defined. In case of performing a square division, since the height and width of the coding unit becomes half the height and width of the coding unit belonging to the parent node, a minimum coding unit size may be obtained by using the above-described information. Alternatively, as an inverse process, a minimum coding unit size and a maximum depth of the tree may be defined in advance and used, and, whenever needed, by using such information a maximum coding unit size may be induced and used. In the square division, since the unit size varies in the form of a multiple of 2, the actual coding unit size may be indicated as a log value using base 2, thereby being capable of increasing transmission efficiency.

The decoder may acquire information indicating whether or not the current unit has been divided. When such information is acquired (transmitted) only under a specific condition, efficiency may be enhanced. For example, since conditions enabling the current unit to be divided correspond to a result of adding a current coding unit size at the current position being smaller than the image size and to a current coding unit size being larger than a predetermined minimum coding unit size, information indicating whether or not division is performed only in such cases may be acquired.

If the above-described information indicate that the coding unit has been divided, the size of the coding unit that is to be divided may become half the size of the current coding unit, and, based upon the current processing position, the current coding unit may be divided into 4 square coding units. The above-described processing may be repeated with respect to each of the divided coding units.

A transform unit corresponds to a basic unit performing transform (e.g., DCT) with respect to an image. Transform unit partitioning information corresponds to information indicating a degree of partitioning of a transform unit. Maximum partitioning information (maximum transform partitioning) of a transform unit corresponds to a parameter for limiting the size of a transform unit.

For a discrete transform, normally, a transform unit has a squared shape (or form), and, just as the coding unit, the transform unit may be recursively divided. In accordance with the characteristics of an image (or picture), the size of a transform unit may be decided to have a most efficient size, and the size of the transform unit may be larger or smaller than a prediction unit. However, generally, one prediction unit may include multiple transform units. The structure and size of a transform unit may also be similarly represented as described above with respect to the above-described coding unit. For example, one transform unit structure may be recursively divided into four transform units, and such transform unit structure may be represented as a type of Quard Tree format. Additionally, diverse information related to the structure of a transform unit may be represented as information on a maximum height (or division depth) of a predetermined transform unit tree, information on a maximum size of a transform unit, a minimum size of a transform unit, an information on a difference between a maximum size and a minimum size of the transform unit, and/or a log value respective to such values, and a depth of a transform unit, a size of a transform unit, and so on, which are drawn by using such values. Meanwhile, a maximum division depth of a transform unit may vary in accordance with a prediction mode of the corresponding unit. Additionally, the size of a coding unit may influence the size of a transform unit.

Information on whether or not the current transform unit has been further divided may also be acquired with respect to the transform unit. For example, in case such information indicates that the corresponding transform unit has been divided, the corresponding transform unit may be recursively divided into four further divided transform units.

Figure 3:
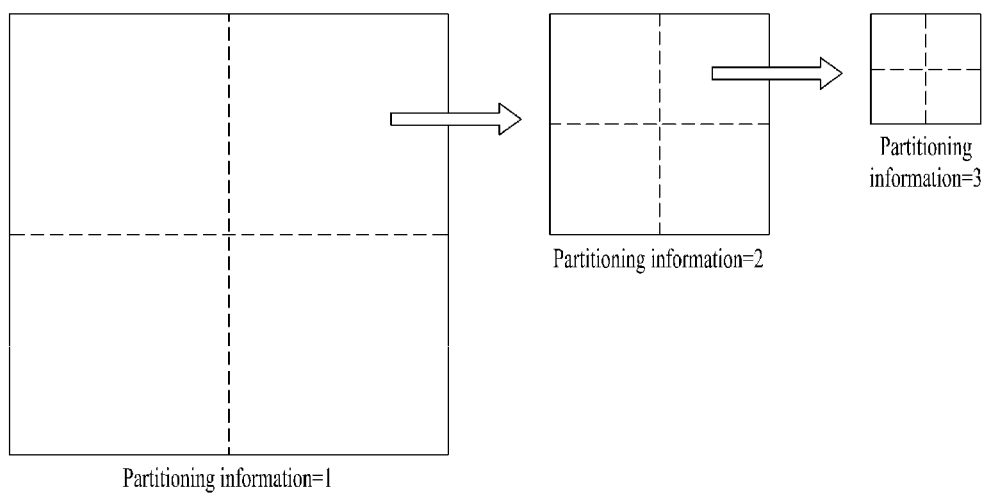
FIG. 3 illustrates an example related to a coding unit and partitioning information of a partition information unit as an exemplary embodiment having the present application applied thereto.

FIG. 3 illustrates an example related to partitioning information of a coding unit and partitioning information of a transform unit as an exemplary embodiment having the present application applied thereto.

In case the partitioning information is equal to 1, a block may be divided into four squares. In case the partitioning information is equal to 2, each of the squares that have been divided (or partitioned), when the partitioning information is equal to 1, may be further divided into four squares. In case the partitioning information is equal to 3, each of the squares that have been divided (or partitioned), when the partitioning information is equal to 2, may be further divided into four squares.

A Prediction Unit (PU) or a prediction block corresponds to a basic unit for performing partitioning. The prediction block may be divided into diverse forms (or shapes), and, hereinafter, each of the divided portions will be referred to as a sub-prediction unit or a sub-prediction block. One prediction block may be divided into sub-prediction blocks having symmetrical shapes, such as squared shapes, rectangular shapes, and so on, or asymmetrical shapes, or geometrical shapes.

Figure 4:
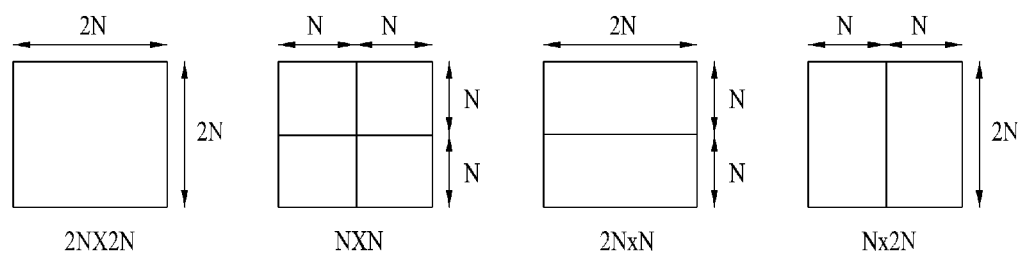
FIG. 4 illustrates examples of a prediction unit and a sub-prediction unit as an exemplary embodiment having the present application applied thereto.

FIG. 4 illustrates examples of a prediction unit and a sub-prediction unit as an exemplary embodiment having the present application applied thereto. One prediction unit may have the size of 2N×2N, N×N, 2N×N, N×2N, and so on.

Information indicating whether or not the prediction block is divided or indicating to what shape the prediction block is divided may be included in the bitstream. Alternatively, such information may also be induced from other information.

Since the characteristics of texture data are different from the characteristics of depth data, when the transformer or inverse transformer decides a transform unit of a depth picture to have the same size as the texture picture, the coding rate may be largely decreased. Therefore, a separate transform unit is required to be defined for the depth data. Hereinafter, a method for efficiently deciding the size of a transform size of the depth data will be described in detail.

As an exemplary embodiment of the present invention, the size of a transform unit may be decided by variably adjusting the size of a transform unit within a maximum partitioning information range of the transform unit. The method for deciding the size of a transform unit is independently applied for each of the texture data and the depth data. This corresponds to a method of deciding an optimal transform unit size by using a rate-distortion optimization (RDO) method while variably changing the size of the transform unit. Maximum partitioning information of a transform unit may be set up, and an optimal transform size may be decided within the maximum partitioning information. In order to achieve optimal quality within a given consistent bit size, rate-distortion optimization (RDO) may use a level of distortion and a generated bit size and a weight value.

Figure 5:
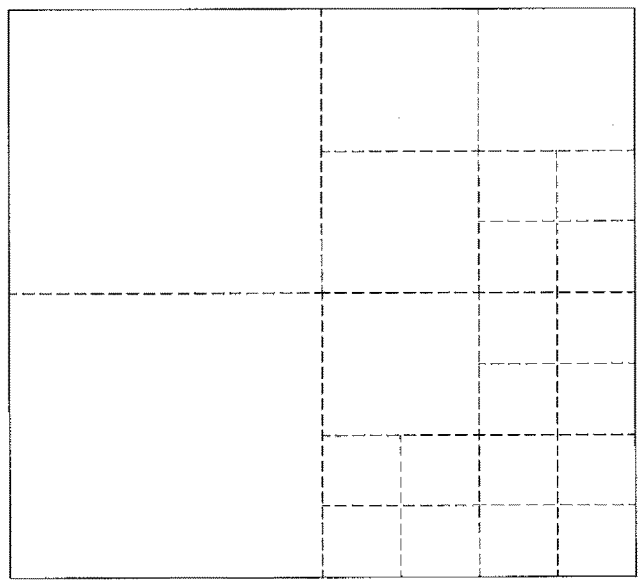
FIG. 5 illustrates an exemplary partitioning of the transform unit as an exemplary embodiment having the present application applied thereto.

FIG. 5 illustrates an exemplary partitioning of the transform unit as an exemplary embodiment having the present application applied thereto.

For example, in case the maximum partitioning information of the transform unit is set to 3, the transform unit (partitioning information=1) is first divided into four squared areas, and, then, each of the four squared areas (partitioning information=2) is further divided into four squared areas (partitioning information=3). Finally, when the partitioning information is divided as an area having partitioning information equal to 3, a total of four areas each being divided as an area having partitioning information equal to 3 are generated in each of the four squared areas having the partitioning information equal to 2. After applying transform on each of the four areas having the partitioning information equal to 3, this is compared with an area having the partitioning information equal to 2 in light of rate-distortion optimization (RDO). As a result, a more efficient partitioning of the transform unit may be selected. Subsequently, after calculating RDO values for each of the four areas having the partitioning information of 2, the calculated value is compared with the RDO value of an area having the partitioning information of 1. After performing such process, finally, partitioning information having the smallest RDO value is selected. And, by performing such process, an optimal transform unit size respective to one transform unit block is selected, as shown in FIG. 5.

Generally, since depth data are simpler than compared texture data, the method of deciding the size of a transform unit by variably adjusting the size of a transform unit within a maximum partitioning information range of the transform unit, wherein the method increases coding efficiency by using diverse transform unit sizes, is not highly efficient for being applied to the depth data as compared to its level of complexity. Therefore, based upon the characteristics of the depth data, a method of decreasing the level of complexity with as less coding efficiency loss as possible by variably adjusting the maximum transform depth is proposed herein.

According to another exemplary embodiment having the present invention applied thereto, there is a method of deciding the transform unit size of depth data by adjusting the maximum partitioning information of the transform unit. Maximum partitioning information of the transform unit may be variably decided based upon generation distribution of transform unit partitioning information respective to the prediction unit size and the coding unit partitioning information. Additionally, an optimal size of the transform unit may be decided by adjusting the transform unit within the maximum partitioning information range of the transform unit.

Figure 6:
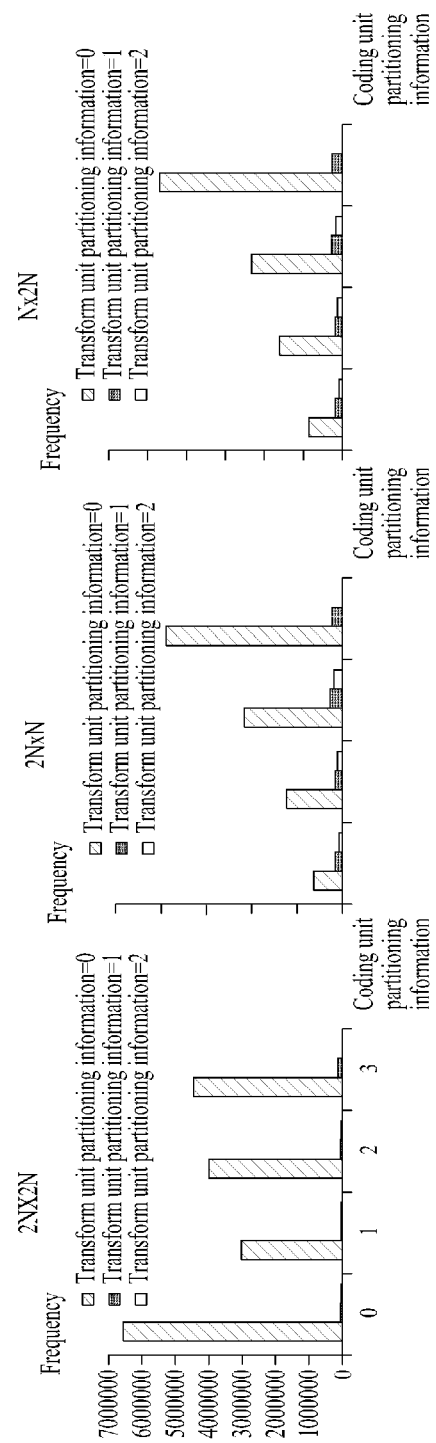
FIG. 6 illustrates a graph showing a generation distribution of transform unit partitioning information, which is generated in accordance with partitioning information of each coding unit, when the prediction unit is equal to 2N×2N, 2N×N, N×2N, as an exemplary embodiment having the present application applied thereto.

FIG. 6 illustrates a graph showing a generation distribution of transform unit partitioning information, which is generated in accordance with partitioning information of each coding unit, when the prediction unit is equal to 2N×2N, 2N×N, N×2N, as an exemplary embodiment having the present application applied thereto.

As shown in the graph of FIG. 6, the diversity in the generation distribution of the transform unit partitioning information in accordance with the prediction unit and coding unit partitioning information may be verified. Referring to the graph, this signifies that the depth data may be efficiently transformed by variably adjusting the maximum partitioning information of the transform unit. Therefore, a variable maximum partitioning information condition of the transform unit may be decided based upon the generation distribution of the transform unit partitioning information respective to prediction unit and the coding unit partitioning information.

In case of 2N×N and N×2N, it is apparent that the generation distributions of the transport unit partitioning information are similar to one another. Accordingly, both 2N×N and N×2N use the same maximum partitioning information condition of a variable transform unit.

When the coding unit partitioning information is equal to 0 and 1, instances of the transform unit partitioning information being equal to 0 occur outstandingly more frequently. Accordingly, when the coding unit partitioning information is equal to 0 and 1, the maximum partitioning information of the transform unit is limited to 0. Additionally, although instances of the transform unit partitioning information being equal to 0 also occur frequently when the coding unit partitioning information is equal to 2 and 3, cases when the transform unit partitioning information is equal to 1 also occur relatively frequently as compared to when the coding unit partitioning information is equal to 0 and 1. Therefore, when the coding unit partitioning information is equal to 2 and 3, the optimal transform unit partitioning may be selected by decreasing the maximum partitioning information of the transform unit down to 1.

Subsequently, in case the prediction unit size is equal to 2N×N and N×2N, when the coding unit partitioning information is equal to 0, since the relative frequency of occurrence of the partitioning information of the transform unit being equal to 0, 1, 2 is greater as compared to other cases, all maximum partitioning information of the transform unit up to 2 is observed and verified. Additionally, when the coding unit partitioning information is equal to 1 and 2, although the frequency of occurrence of the partitioning information of the transform unit being equal to 1 and 2 may be similar to the case when the coding unit partitioning information is equal to 0, since the frequency of occurrence of the transform unit partitioning information being equal to 0 is relatively higher, in this case, the maximum partitioning information of the transform unit is limited to 1. Finally, when the coding unit partitioning information is equal to 3, since instances of the transform unit partitioning information being equal to 0 occur outstandingly more frequently as compared to other cases, the maximum partitioning information of the transform unit is limited to 0. Based upon the description provided above, the maximum partitioning information condition of the transform unit is created as shown below in Table 1.

TABLE 1

| Prediction Unit Size | Coding Unit Partitioning | Maximum Partitioning of Transform Unit |
| --- | --- | --- |
| 2N X 2N | 0 | 0 |
|  | 1 | 0 |
|  | 2 | 0, 1 |
|  | 3 | 0, 1 |
| 2N X N, N X 2N | 0 | 0, 1, 2 |
|  | 1 | 0, 1 |
|  | 2 | 0, 1 |
|  | 3 | 0 |

Since the encoder and the decoder should be equally operated, the maximum partitioning information condition of the transform unit may be equally applied to the encoder and the decoder.

Figure 7:
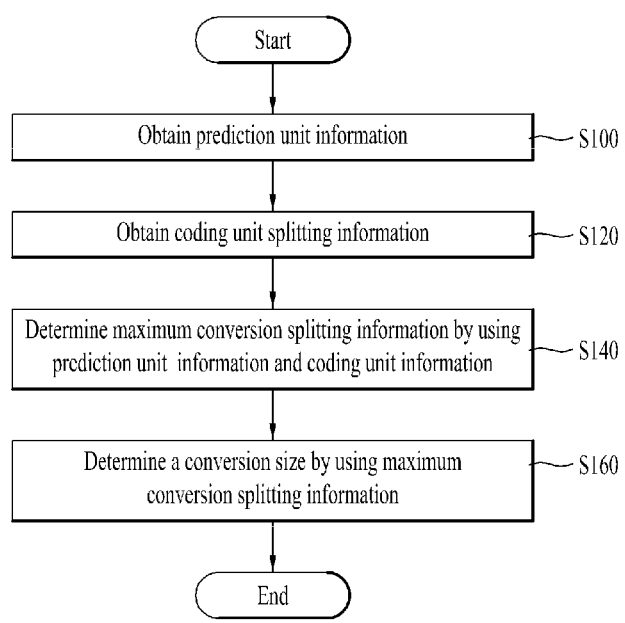
FIG. 7 illustrates a flow chart of a method for deciding a transform unit size as an exemplary embodiment having the present application applied thereto.

FIG. 7 illustrates a flow chart of a method for deciding a transform unit size as an exemplary embodiment having the present application applied thereto.

Prediction unit information is acquired (or obtained) (S100). The prediction unit information may include all types of information for predicting a depth picture, such as prediction unit size, prediction mode, and so on. The prediction unit size may have a squared shape (or form) of 2N×2N, N×N and may also have a rectangular shape (or form) of 2N×N, N×2N. And, N may correspond to a natural number.

Coding unit information is acquired (or obtained) (S120). The coding unit information may include coding unit size, partitioning information (or splitting information) of a coding unit, and so on. The coding unit partitioning information corresponds to information indicating a partitioning level of a coding unit.

Maximum partitioning information of a transform unit (or conversion unit) of a transform unit is acquired by using the acquired prediction unit information and coding unit partitioning information (S140).

When the prediction unit size is equal to 2N×2N, N×N, and when the coding unit information is equal to 0 or 1, the maximum partitioning information of the transform unit may be equal to 0. And, when 2N×2N, N×N, and when the coding unit information is equal to 2 or 3, the maximum partitioning information of the transform unit may be equal to 0 or 1.

When the prediction unit size is equal to 2N×N, N×2N, and when the coding unit information is equal to 0, the maximum partitioning information of the transform unit may be equal to any one of 0, 1, and 2. When the prediction unit size is equal to 2N×2N, N×N, and when the coding unit information is equal to 1 or 2, the maximum partitioning information of the transform unit may be equal to any one of 0 and 1. When the prediction unit size is equal to 2N×2N, N×N, and when the coding unit information is equal to 3, the maximum partitioning information of the transform unit may be equal to 0.

The size information of the transform unit is decided by using the maximum partitioning information of the transform unit (S160). The size information of the transform unit may include information indicating the size of a transform unit or information for inducing (or deducing) the size of a transform unit. The size of a transform unit may be decided within a maximum partition information range of a transform unit. The size of a transform unit may be equal to or smaller than the maximum partitioning information. Alternatively, rate-distortion optimization may be calculated by using the maximum partitioning information of a transform unit, and the size information of a transform unit having the smallest rate-distortion optimization may be decided.

As an exemplary embodiment of this application, a video decoding device may include a parsing unit, which is configured to acquire prediction unit information and coding unit information of depth data, and the inverse-transform unit, which is configured to acquire maximum partitioning information of a transform unit of a depth block by using the prediction unit information and the coding unit information, to decide transform unit size information of the depth block by using the maximum partitioning information of the transform unit of the depth block, to perform inverse-transform on depth data by using the transform unit size information of the depth block, and to decide a size of the transform unit within a maximum partitioning information range of the transform unit.

As another exemplary embodiment for adjusting the maximum partitioning information of a transform unit, there is a method using texture data. Generally, texture data and depth data have similar characteristics. More specifically, a complex area of a texture video is also highly likely to have complex depth data in a depth video. Therefore, by using the above-described characteristics, a transform size may be decided from the depth video.

Figure 8:
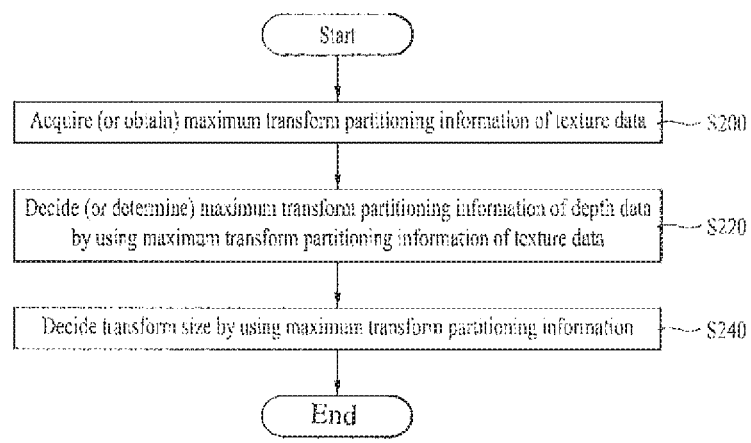
FIG. 8 illustrates an exemplary method for selecting transform unit partitioning of depth data by using texture as an exemplary embodiment having the present application applied thereto.

FIG. 8 illustrates a flow chart of a method for deciding transform unit size of depth data by using texture data as an exemplary embodiment having the present application applied thereto.

Maximum partitioning information of a transform unit of texture data is acquired (S200). Since 3DV encoding encodes depth data after encoding the texture data firsthand, when encoding the depth data, the encoding of the texture data is already completed and the respective information may be used.

Maximum partitioning information of a transform unit of depth data is acquired by using the maximum partitioning information of the transform unit of texture data (S220). When the maximum partitioning information of the transform unit of an RQT depth of a current depth block is decided, maximum partitioning information of the transform unit of a depth block that is currently being encoded is decided by using the maximum partitioning information of a transform unit, which is selected from the corresponding texture block.

For example, when encoding of the texture data is already completed and when the maximum partitioning information the transform unit partitioning information of a transform unit of the corresponding area is decided to be equal to 1, the maximum partitioning information of the transform unit of a depth area that is currently being processed with encoding is limited to up to 1, and, then, encoding of the corresponding depth block is performed.

A transform unit size is decided by using the maximum partitioning information information of the transform unit of the depth data (S240).

As described above, a decoding/encoding device having the present invention applied therein may be equipped in a multimedia broadcast transmitting/receiving device, such as DMB (Digital Multimedia Broadcasting), and may be used for decoding video signal and data signals, and so on. Additionally, the multimedia broadcast transmitting/receiving device may include a mobile communication terminal.

Additionally, a decoding/encoding method having the present invention applied therein may be fabricated and produced as a program designed to be executed in a computer, thereby being stored in a recording medium that can be read by the computer, and multimedia data having a data structure according to the present invention may also be stored in a recording medium that can be read by the computer (or computer-readable recording medium). The computer-readable medium includes all types of recording devices, which store data that can be read by a computer system. Examples of the computer-readable recording medium include ROM, RAM, CD-ROM, magnetic tape, floppy disk, optical data storage device, and so on, and may also include media that can be realized in the form of carrier wave (e.g., transmission via Internet). Furthermore, a bitstream that is created by the encoding method may be stored in the computer-readable recording medium or may be transmitted by using a wired/wireless communication network.

INDUSTRIAL APPLICABILITY

The present invention may be used for coding video signals.

What is claimed is:

1. A method for performing an inverse-transform on depth data based on a size of a transform unit by a decoding apparatus, comprising:

acquiring, by the decoding apparatus, prediction unit size information indicating a size of a prediction unit and coding unit partitioning information indicating a partitioning depth of a coding unit, wherein the coding unit is symmetrically partitioned into one or more prediction units;

determining, by the decoding apparatus, maximum partitioning information of the transform unit using the prediction unit size information and the coding unit partitioning information;

determining, by the decoding apparatus, the size of the transform unit by partitioning a depth block within a maximum partitioning range indicated by the determined maximum partitioning information; and performing, by the decoding apparatus, the inverse-transform on the depth data based on the determined size of the transform unit, wherein the coding unit partitioning information is 0 for a 2N×2N prediction unit, the maximum partitioning information of the transform unit is equal to 0, wherein the coding unit partitioning information is 1 for a 2N×2N prediction unit, the maximum partitioning information of the transform unit is equal to 0, wherein the coding unit partitioning information is 2 for a 2N×2N prediction unit, the maximum partitioning information of the transform unit is equal to 0 or 1, wherein the coding unit partitioning information is 3 for a 2N×2N prediction unit, the maximum partitioning information of the transform unit is equal to 0 or 1, wherein the coding unit partitioning information is 0 for a 2N×N or N×2N prediction unit, the maximum partitioning information of the transform unit is equal to 0, 1 or 2, wherein the coding unit partitioning information is 1 for a 2N×N or N×2N prediction unit, the maximum partitioning information of the transform unit is equal to 0 or 1, wherein the coding unit partitioning information is 2 for a 2N×N or N×2N prediction unit, the maximum partitioning information of the transform unit is equal to 0 or 1, wherein the coding unit partitioning information is 3 for a 2N×N or N×2N prediction unit, the maximum partitioning information of the transform unit is equal to 0, and wherein N is a natural number.

2. A method for transforming depth data based on a size of a transform unit by an encoding apparatus, comprising:

acquiring, by the encoding apparatus, prediction unit size information indicating a size of a prediction unit and coding unit partitioning information indicating a partitioning depth of a coding unit, wherein the coding unit is symmetrically partitioned into one or more prediction units;

determining, by the encoding apparatus, maximum partitioning information of the transform unit using the prediction unit size information and the coding unit partitioning information;

determining, by the encoding apparatus, the size of the transform unit by partitioning a depth block within a maximum partitioning range indicated by the determined maximum partitioning information; and transforming, by the encoding apparatus, the depth data based on the determined size of the transform unit, wherein the coding unit partitioning information is 0 for a 2N×2N prediction unit, the maximum partitioning information of the transform unit is equal to 0, wherein the coding unit partitioning information is 1 for a 2N×2N prediction unit, the maximum partitioning information of the transform unit is equal to 0, wherein the coding unit partitioning information is 2 for a 2N×2N prediction unit, the maximum partitioning information of the transform unit is equal to 0 or 1, wherein the coding unit partitioning information is 3 for a 2N×2N prediction unit, the maximum partitioning information of the transform unit is equal to 0 or 1, wherein the coding unit partitioning information is 0 for a 2N×N or N×2N prediction unit, the maximum partitioning information of the transform unit is equal to 0, 1 or 2, wherein the coding unit partitioning information is 1 for a 2N×N or N×2N prediction unit, the maximum partitioning information of the transform unit is equal to 0 or 1, wherein the coding unit partitioning information is 2 for a 2N×N or N×2N prediction unit, the maximum partitioning information of the transform unit is equal to 0 or 1, wherein the coding unit partitioning information is 3 for a 2N×N or N×2N prediction unit, the maximum partitioning information of the transform unit is equal to 0, and wherein N is a natural number.

* * * * *